United States Patent
Yamane et al.

(10) Patent No.: US 10,735,440 B2
(45) Date of Patent: Aug. 4, 2020

(54) COMMUNICATION DESTINATION DETERMINATION DEVICE, COMMUNICATION DESTINATION DETERMINATION METHOD, AND RECORDING MEDIUM

(71) Applicant: NEC Corporation, Minato-ku, Tokyo (JP)

(72) Inventors: Masato Yamane, Tokyo (JP); Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 152 days.

(21) Appl. No.: 15/753,620

(22) PCT Filed: Sep. 7, 2016

(86) PCT No.: PCT/JP2016/004069
§ 371 (c)(1),
(2) Date: Feb. 20, 2018

(87) PCT Pub. No.: WO2017/043073
PCT Pub. Date: Mar. 16, 2017

(65) Prior Publication Data
US 2018/0288075 A1   Oct. 4, 2018

(30) Foreign Application Priority Data

Sep. 10, 2015  (JP) .................... 2015-178305

(51) Int. Cl.
*H04K 1/00* (2006.01)
*H04L 9/00* (2006.01)
(Continued)

(52) U.S. Cl.
CPC .......... *H04L 63/1416* (2013.01); *G06F 21/55* (2013.01); *H04L 43/04* (2013.01);
(Continued)

(58) Field of Classification Search
CPC . H04L 63/1416; H04L 63/1425; H04L 63/20; H04L 43/04
(Continued)

(56) References Cited

U.S. PATENT DOCUMENTS

2002/0133603 A1   9/2002  Mitomo et al.
2003/0133712 A1*  7/2003  Arikawa ............. H04J 14/0287
                                                            398/2
(Continued)

FOREIGN PATENT DOCUMENTS

EP    2702524 B1    3/2014
JP    2005-44277 A  2/2005
(Continued)

OTHER PUBLICATIONS

Extended European Search Report for EP Application No. EP16843941.2 dated Mar. 28, 2019.
(Continued)

*Primary Examiner* — Wasika Nipa
*Assistant Examiner* — Samuel Ambaye

(57) ABSTRACT

Provided are a communication destination determination device and the like in which a communication destination that is highly likely to pose a threat can be detected. A communication destination determination device 101 is provided with: a signal transmission unit 102 which transmits, when a first signal transmitted from a communication destination 104 is received via a communication network, a second signal in response to the first signal to the communication destination 104; and a communication destination determination unit 103 which classifies whether the communication destination 104 is highly likely to pose a threat or not, on the basis of whether or not a third signal transmitted from the communication destination 104 is
(Continued)

received within a certain time period from the timing of transmission of the second signal.

7 Claims, 13 Drawing Sheets

(51) Int. Cl.
  *H04L 9/28* (2006.01)
  *H04L 29/06* (2006.01)
  *G06F 21/55* (2013.01)
  *H04L 12/26* (2006.01)
(52) U.S. Cl.
  CPC ...... *H04L 63/0281* (2013.01); *H04L 63/1425* (2013.01); *H04L 63/20* (2013.01)
(58) Field of Classification Search
  USPC .......................................................... 726/23
  See application file for complete search history.

(56) References Cited

U.S. PATENT DOCUMENTS

| 2004/0019781 | A1 | 1/2004 | Chari et al. |
| 2005/0022000 | A1 | 1/2005 | Inomata et al. |
| 2007/0130312 | A1 | 6/2007 | Shin et al. |
| 2010/0318681 | A1 | 12/2010 | Shi |
| 2012/0278886 | A1* | 11/2012 | Luna ..................... G06F 21/552 726/22 |
| 2013/0031626 | A1 | 1/2013 | Kim |
| 2013/0263268 | A1 | 10/2013 | Kim et al. |

FOREIGN PATENT DOCUMENTS

| JP | 2005-535021 A | 11/2005 |
| JP | 2007-133872 A | 5/2007 |
| JP | 2007-328417 A | 12/2007 |
| JP | 2008-146660 A | 6/2008 |
| JP | 2008-177714 A | 7/2008 |
| JP | 2009-237807 A | 10/2009 |
| JP | 2010-267283 A | 11/2010 |
| JP | 2013-9185 A | 1/2013 |
| JP | 2014-2631 A | 1/2014 |
| WO | 2008/007669 A1 | 1/2008 |

OTHER PUBLICATIONS

Communication dated Aug. 2, 2016 issued by the Japanese Patent Office in counterpart application No. 2015-178305.
Communication dated Nov. 22, 2016 issued by the Japanese Patent Office in counterpart application No. 2015-178305.
International Search Report dated Oct. 4, 2016 in PCT/JP2016/004069.
Y., Tyama, "Architecture for networking home electric devices, Entirety of Universal Plug and Play 2", Interface, CQ publication corporation, Jul. 1, 2003, vol. 29, 7th edition, p. 167 (13 pages).

* cited by examiner

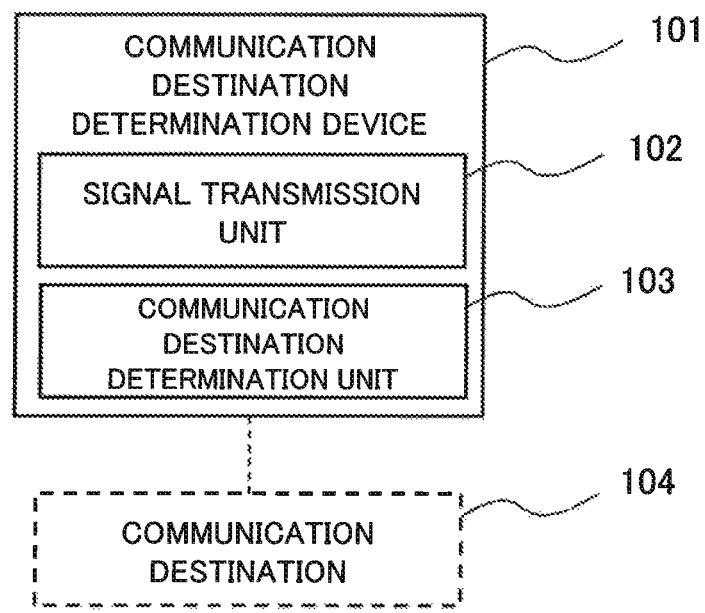
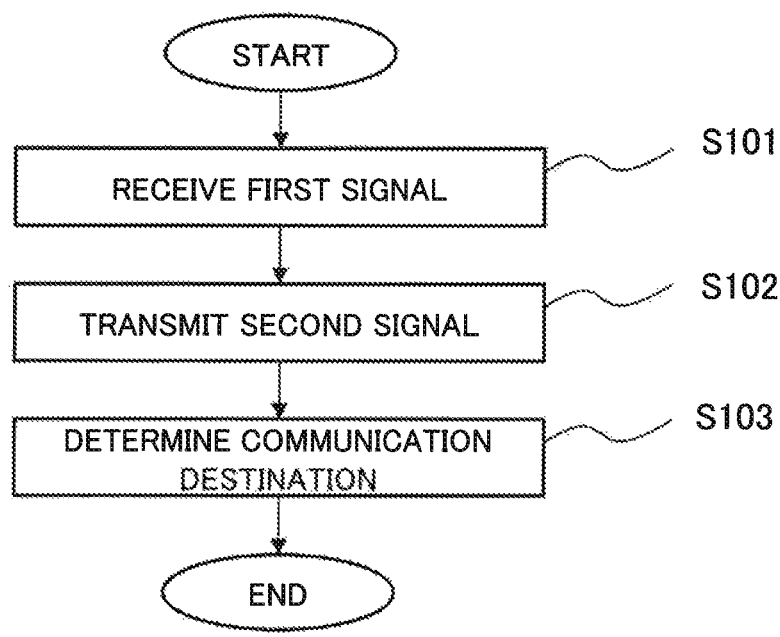

Fig.3

```
GET / HTTP/1.1
Accept: image/gif, image/jpeg, */*
Accept-Language: ja
Accept-Encoding: gzip, deflate
User-Agent: Mozilla/4.0 (Compatible; MSIE 6.0; OS 10;)
Host: www.xxx.zzz
Connection: Keep-Alive
* * * *
```

Fig.4

```
HTTP/1.1 200 OK
Date: Sun, 11 Jan 2004 16:06:23 GMT
Server: Apache/*** (Unix) (Red-Hat/Linux)
Last-Modified: Sun, 07 Dec 201512:34:18 GMT
ETag: "1bac-132b-3fde3e4a"
Accept-Ranges: bytes
Content-Length: 491
Keep-Alive: timeout=23, max=50
Connection: Keep-Alive
Content-Type: text/html
. . .
```

COMMUNICATION DESTINATION DETERMINATION DEVICE, COMMUNICATION DESTINATION DETERMINATION METHOD, AND RECORDING MEDIUM

This application is a National Stage Entry of PCT/JP2016/004069 filed on Sep. 7, 2016, which claims priority from Japanese Patent Application 2015-178305 filed on Sep. 10, 2015, the contents of all of which are incorporated herein by reference, in their entirety.

TECHNICAL FIELD

The present invention relates to a communication destination determination device and the like which are useful for securing security.

BACKGROUND ART

A server such as a web server and a mail server receives a request and the like for acquiring a mail from a plurality of communication destinations (communication devices) via a communication network such as an intranet or the Internet.

For example, Patent Literature 1 and Patent Literature 2 disclose devices that manage a server capable of processing a request signal received via a communication network, respectively. The technologies disclosed in Patent Literature 1 and Patent Literature 2 will be respectively described.

The managing device disclosed in Patent Literature 1 generates a request category log in which the number of request signals received via the communication network are classified based on predetermined time intervals and types of the requests. The managing device further generates, in accordance with predetermined time interval, a system log in which a resource usage amount in the server managing the requests are recorded. The managing device calculates a usage amount of resources required for processing the requests every request on the basis of the generated request category log and the generated system log.

The request limiting device disclosed in Patent Literature 2 can limit a request having high possibility of reducing processing loads according to the state of the loads in the server. The request limiting device classifies requests into a plurality of request patterns, and calculates loads when performing request-based processing every classified request pattern. For a certain request, the request limiting device specifies a request pattern to which the request belongs, and determines whether or not to limit the certain request on the basis of loads when processing a request belonging to the specified request pattern.

In the case of constructing the above-described server in the aforementioned example, it is not only necessary to secure high security in the server, but also reduce risk of a threat (an unauthorized program) from a malicious communication destination via the communication network. For example, Patent Literature 3 discloses a vulnerability diagnosis conducting apparatus capable of diagnosing vulnerability of a host device.

In the case of performing a process for diagnosing vulnerability of the host device, the vulnerability diagnosis conducting apparatus has history information indicating a time at which the process has been performed. In the case of diagnosing vulnerability of a certain host device, the vulnerability diagnosis conducting apparatus estimates a time required for diagnosing vulnerability of the certain host device on the basis of the history information and generates a schedule for diagnosing the certain host device on the basis of the estimated time.

CITATION LIST

Patent Literature

PTL 1: International Publication No. WO 2008/007669
PTL 2: Japanese Laid-open Patent Publication No. 2007-328417
PTL 3: Japanese Laid-open Patent Publication No. 2009-237807

SUMMARY OF INVENTION

Technical Problem

Attack method of malicious communication destination to a device increases. As a consequence, for example, even though vulnerability of the server is efficiently diagnosed using the vulnerability diagnosis conducting apparatus disclosed in Patent Literature 3, the apparatus cannot always diagnose all types of vulnerability. The reason for this is because the apparatus is not always able to detect the communication destination that attacks according to various attack methods.

Therefore, one of main objects of the present invention is to provide a communication destination determination device and the like capable of detecting a suspicious communication destination as a threat.

Solution to Problem

In order to achieve the above-described object, as an aspect of the present invention, a communication destination determination device including:

signal transmission means for transmitting a second signal in response to a first signal to a communication destination when the first signal is received from the communication destination via a communication network; and communication destination determination means for determining whether or not the communication destination is suspicious as a threat on a basis of whether or not a third signal transmitted from the communication destination is received within a certain time period after a timing of transmission of the second signal.

In addition, as another aspect of the present invention, a communication destination determination method including:

transmitting a second signal in response to a first signal to a communication destination when the first signal is received from the communication destination via a communication network; and determining whether or not the communication destination is suspicious as a threat on a basis of whether or not a third signal transmitted from the communication destination is received within a certain time period after a timing of transmission of the second signal.

Furthermore, the object is also realized by an associated communication destination determination program, and a computer-readable recording medium which records the program.

Advantageous Effects of Invention

In accordance with the communication destination determination device and the like according to the present invention, it is possible to detect a suspicious communication destination as a threat.

BRIEF DESCRIPTION OF DRAWINGS

FIG. 1 is a block diagram illustrating a configuration of a communication destination determination device according to a first example embodiment of the present invention.

FIG. 2 is a flowchart illustrating the flow of processing in the communication destination determination device according to the first example embodiment.

FIG. 3 is a diagram illustrating an example of a request signal.

FIG. 4 is a diagram illustrating an example of a response signal (the second signal).

DESCRIPTION OF EMBODIMENTS

Figure 5:
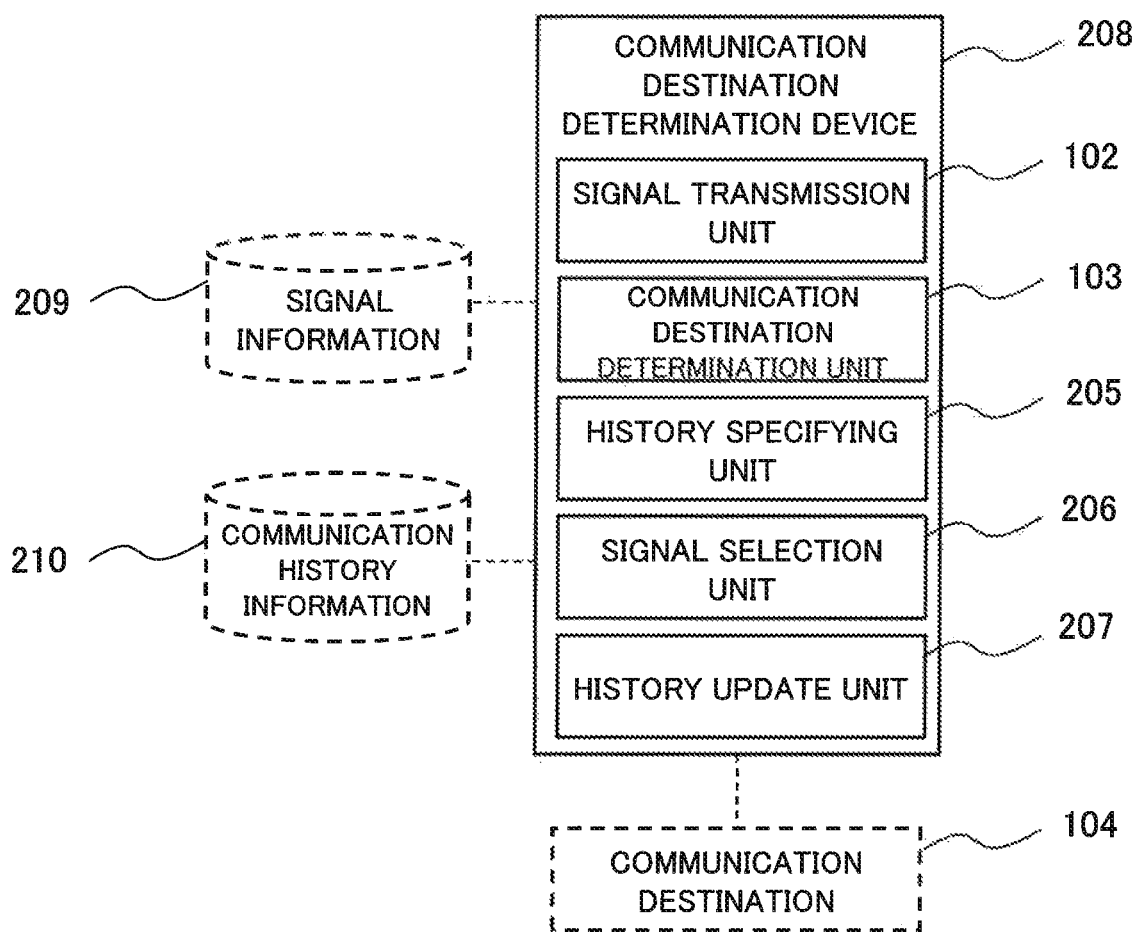
FIG. 5 is a block diagram illustrating a configuration of a communication destination determination device according to a second example embodiment of the present invention.

Next, example embodiments embodying the present invention will be described in detail with reference to the drawings.

First Example Embodiment

With reference to FIG. 1, configuration of a communication destination determination device 101 according to a first example embodiment of the present invention will be described in detail. FIG. 1 is a block diagram illustrating the configuration of the communication destination determination device 101 according to the first example embodiment of the present invention.

The communication destination determination device 101 according to the first example embodiment has a signal transmission unit (signal transmitter) 102 and a communication destination determination unit (communication destination determiner) 103.

The communication destination determination device 101 can perform communication connection with a communication destination (a communication device) 104 via a communication network.

Hereinafter, processing in the communication destination determination device will be described; however, for the purpose of convenience, information transmitted/received via the communication network is assumed to be processed in accordance with HTTP. The HTTP indicates an abbreviation for Hypertext_Transfer_Protocol. The information transmitted/received via the communication network may not be processed in accordance with the HTTP and may be processed according to another communication protocols.

With reference to FIG. 2, the processing in the communication destination determination device 101 according to the first example embodiment will be described in detail. FIG. 2 is a flowchart illustrating the flow of the processing in the communication destination determination device 101 according to the first example embodiment.

The communication destination 104 transmits a request signal (hereinafter, also referred to as a "first signal") to the communication destination determination device 101 via the communication network. The request signal, for example, is a signal for requiring a certain file. In the case of a HTTP request, the request signal, for example, is a signal including a request illustrated in an example 1 to an example 3.

Example 1

GET/HTTP/1.1 (a request signal for requiring a file in a directory "/", which is described in HTTP version 1.1)

Example 2

GET/rom-0 HTTP/1.1 (a request signal for requiring a file "rom-0" in the directory "/", which is described in the HTTP version 1.1)

Example 3

GET/nnnn/nnn/nn.php HTTP/1.1 (a request signal for requiring a file "nn.php" in a directory "/nnnn/nnn", which is described in the HTTP version 1.1)

With reference to FIG. 3, the request signal (the first signal) will be described in more detail. FIG. 3 is a diagram illustrating an example of the request signal.

For example, the request signal may have a header ("Accept:" to "Keep-Alive") including information and the like indicating that an address (an item of "Host" in FIG. 3) indicating a communication destination is "www.xxx.zzz", in addition to the requests illustrated in the example 1 to the example 3. The header, for example, may include information and the like indicating that an operating system of the communication destination is "OS_10". Since the request signal illustrated in the example 3 conforms to the HTTP, a detailed description for each item in FIG. 3 will be omitted.

Referring to FIG. 2, the signal transmission unit 102 receives the first signal (the request signal) transmitted by the communication destination 104 (step S101). The signal transmission unit 102 transmits a response signal (hereinafter, also referred to as a "second signal") in response to the received the first signal to the communication destination 104 (step S102).

In the case of the HTTP version 1.1, the response signal is a signal as illustrated in an example of FIG. 4, and for example, is a signal including a response of "200_OK" indicating normal completion of processing for the received request signal. FIG. 4 is a diagram illustrating an example of the response signal (the second signal). The response signal may include a header ("Date:" to "text/html") in which a date and the like has been described, information (a message body) to respond the request signal, and the like, in addition to the response of "200_OK". Since the response signal exemplified in FIG. 4 conforms to the HTTP, a detailed description for each item in FIG. 4 will be omitted. The response signal transmitted by the signal transmission unit 102 may not be always a signal indicating normal completion of processing for the request signal.

Referring to FIG. 2, after step S102, the communication destination determination unit 103 determines whether or not the communication destination 104 is suspicious as a threat on the basis of whether or not it is possible to receive a third signal from the communication destination 104 within a certain period time after the timing of transmission of the second signal (the response signal) to the communication destination 104 (step S103). When the third signal is received within the certain period time after the timing of transmission of the response signal to the communication destination 104, the communication destination determination unit 103 determines that the communication destination 104 is suspicious as a threat. When the third signal is not received within the certain period time after the timing of transmission of the response signal to the communication destination 104, the communication destination determination unit 103 determines that the communication destination 104 is less likely to pose a threat in relation to the second signal.

In step S103, the third signal, for example, is a request signal. In this case, the third signal may be a signal for requiring the same file as that of the first signal or a signal for requiring a different file.

In step S103, the certain period time, for example, is 30 minutes. In this case, the communication destination determination unit 103 determines whether or not the communication destination 104 is suspicious as a threat on the basis of whether or not the third signal is received from the communication destination 104 within 30 minutes after the timing of transmission of the second signal (the response signal) to the communication destination 104. When the third signal is received within 30 minutes after the timing of transmission of the response signal to the communication destination 104, the communication destination determination unit 103 determines that the communication destination 104 is suspicious as a threat. When the third signal is not received within the certain period time after the timing of transmission of the response signal to the communication destination 104, the communication destination determination unit 103 determines that the communication destination 104 is less likely to pose a threat in relation to the second signal.

The communication destination determination unit 103 may output information (for example, an address) about a suspicious communication destination 104 with a threat to a display device (not illustrated), an external device (not illustrated) and the like.

A manager, who monitors communication performed via the communication network, for example, can specify a communication destination that is less likely to pose a threat by referring to the information displayed on the display device.

Next, effects for the communication destination determination device 101 according to the first example embodiment will be described.

According to the communication destination determination device 101, it is possible to detect a suspicious communication destination as a threat. The reason for this will be described in detail.

A signal transmitted/received via the communication network is largely classified into a suspicious signal as a threat and a less suspicious signal as a threat. The inventor of the present application has found a tendency that when the first signal is received from a certain communication destination, it is possible to determine whether or not the certain communication destination is suspicious as a threat on the basis of whether or not the certain communication destination transmits the third signal within a predetermined time period with respect to the second signal transmitted in response to the first signal. This determination method will be described in detail below.

For the convenience of description, it is assumed that the certain communication destination transmits the first signal to the server via the communication network.

The inventor of the present application has found that the certain communication destination can be largely classified into a first communication device, which transmits the third signal to the server within the predetermined time period in response to the reception of the second signal in the certain communication destination in response to the first signal, and a second communication device which does not transmit the third signal to the server regardless of the reception of the second signal. Furthermore, in such a case, the inventor of the present application has found a tendency (a characteristic) that the first communication device is suspicious as a threat and the second communication device is less likely to pose a threat. As a consequence, the inventor of the present application has found a tendency that it is possible to determine whether or not the certain communication destination is suspicious as a threat on the basis of whether or not the third signal is received within the predetermined time period after the second signal in response to the first signal is transmitted.

As described above, the communication destination determination device 101 according to the present example embodiment determines whether a communication destination is suspicious as a threat by using the tendency, so that it is possible to detect a suspicious communication destination as a threat in accordance with the communication destination determination device 101 according to the present example embodiment.

In contrast, since the vulnerability diagnosis conducting apparatus disclosed in Patent Literature 3 does not use the tendency as described above, it is not always possible to detect a suspicious communication destination as a threat.

That is, in accordance with the communication destination determination device 101 according to the first example embodiment, it is possible to detect a suspicious communication destination as a threat.

The communication destination determination device 101 starts processing in response to the reception of the first signal transmitted by the communication destination 104; however, for example, it may be possible to employ a mode in which a fourth signal is transmitted to the communication destination 104 and the communication destination 104 transmits the first signal in response to the fourth signal.

Furthermore, in the aforementioned example, the communication destination determination device 101 transmits the second signal and further receives the third signal; however, it is not always necessary to allow one device to perform the process for transmitting the second signal and the process for receiving the third signal. When the communication determination device 101 is provided in a plural number, it may be determined whether a certain communication determination device transmits the second signal and a communication determination device different from the certain communication determination device receives the third signal.

Moreover, the aforementioned function can also be performed using a proxy scanner (hereinafter, also referred to as a "second communication destination") that searches for an IP address indicating a proxy server capable of performing communication connection with the communication network. In this case, a transmission destination of the second signal from the communication destination determination device 101 does not always need to be a communication destination having transmitted the first signal. A description will be provided for a process mode in which the aforementioned function is performed using the proxy server.

The proxy scanner transmits a fifth signal to a specific device. The specific device receives the fifth signal transmitted by the proxy scanner, and transmits a sixth signal to the server in response to the received fifth signal. The server receives the sixth signal transmitted by the specific device, and transmits a seventh signal in response to the received sixth signal to the specific device. The specific device receives the seventh signal transmitted by the server, and transmits an eighth signal to the proxy scanner in response to the received seventh signal. The proxy scanner receives the eighth signal transmitted by the specific device. The proxy scanner determines whether or not the specific device has a proxy function on the basis of whether or not the fifth signal and the sixth signal coincide with each other, the seventh signal and the eighth signal coincide with each other, and the eighth signal is a signal in response to the fifth signal. In this processing, when the specific device is the communication destination determination device 101, the communication destination determination device 101 transmits the sixth signal to the server in response to the fifth signal transmitted by the proxy scanner, and determines whether or not the server is suspicious as a threat on the basis of whether or not the seventh signal transmitted by the server in response to the sixth signal is received within a predetermined period time from the timing of transmission of the sixth signal.

The aforementioned example has described the flow of the processing in which the communication destination determination device 101 determines whether or not a communication destination having transmitted the first signal is suspicious as a threat with reference to an example in which the communication destination transmits the third signal; however, only one communication destination is not always provided. For example, as will be described later in a third example embodiment, the communication destination determination device 101 may determine whether or not a communication destination is suspicious as a threat on the basis of a port and the like through which a signal (the first signal or the third signal) is received.

Second Example Embodiment

Next, a second example embodiment of the present invention based on the aforementioned first example embodiment will be described.

In the following description, characteristics according to the present example embodiment will be mainly described, and the same reference numerals are given to configuration similar to those of the aforementioned first example embodiment and a redundant description will be omitted.

With reference to FIG. 5, configuration of a communication destination determination device 208 according to the second example embodiment of the present invention will be described in detail. FIG. 5 is a block diagram illustrating the configuration of the communication destination determination device 208 according to the second example embodiment of the present invention.

The communication destination determination device 208 according to the second example embodiment has the signal transmission unit (signal transmitter) 102, the communication destination determination unit (communication destination determiner) 103, a history specifying unit (history specifier) 205, a signal selection unit (signal selector) 206, and a history update unit (history updater) 207. The communication destination determination device 208 can refer to, update, or store signal information 209, which will be described later with reference to FIG. 7, and communication history information 210 which will be described later with reference to FIG. 8.

The communication destination determination device 208 can perform communication connection with the communication destination (a communication device) 104 via the communication network.

Figure 7:
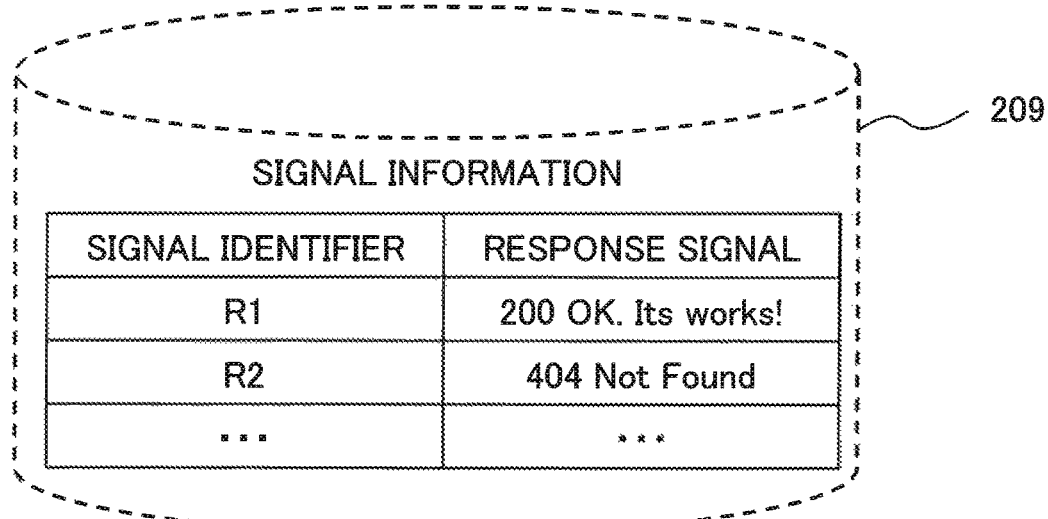
FIG. 7 is a diagram conceptually illustrating an example of signal information.

With reference to FIG. 7, the signal information 209 will be described. FIG. 7 is a diagram conceptually illustrating an example of the signal information 209.

When the request signal (the first signal) is received from the communication destination 104, the signal information 209 includes the response signal (the second signal) effective for the received request signal. As illustrated in FIG. 7, the signal information 209 may be information in which the response signal and signal identifier capable of identifying the response signal are associated with each other.

In the signal information 209 exemplified in FIG. 7, a signal identifier "R1" is associated with a response signal "200_OK._Its_works!". This indicates that a signal identifier indicating the response signal "200_OK._Its_works!" is "R1" and "200_OK._Its_works!" can be transmitted as a response signal effective for a request signal. Furthermore, in the signal information 209 exemplified in FIG. 7, a signal identifier "R2" is associated with a response signal "400_Not_Found". This indicates that a signal identifier indicating the response signal "404_Not_Found" is "R2" and "404_Not_Found" can be transmitted as a response signal effective for a request signal.

The signal information 209 may include many response signals, or items different from those (the signal identifier and the response signal) exemplified in FIG. 7. That is, the signal information 209 is not limited to the aforementioned example.

Figure 8:
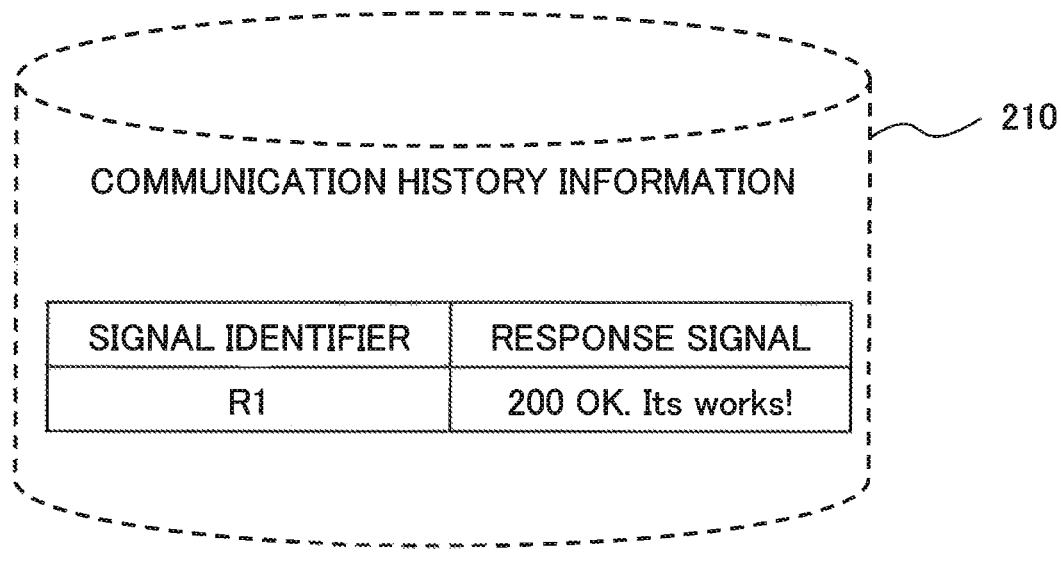
FIG. 8 is a diagram conceptually illustrating an example of communication history information.

Next, with reference to FIG. 8, the communication history information 210 will be described. FIG. 8 is a diagram conceptually illustrating an example of the communication history information 210.

The communication history information 210 includes a response signal transmitted to the communication destination 104 in response to a received request signal. As illustrated in FIG. 8, the communication history information 210 may be information in which the response signal and a signal identifier capable of identifying the response signal are associated with each other.

In the communication history information 210 exemplified in FIG. 8, the signal identifier "R1" is associated with the response signal "200_OK._Its_works!". This represents a history that the signal identifier indicating the response signal "200_OK._Its_works!" is "R1" and the signal transmission unit 102 has transmitted the response signal "200_OK._Its_works!" in response to the request signal (the first signal).

The communication history information 210 may include many response signals, or items different from those exemplified in FIG. 8. That is, the communication history information 210 is not limited to the aforementioned example.

Figure 6:
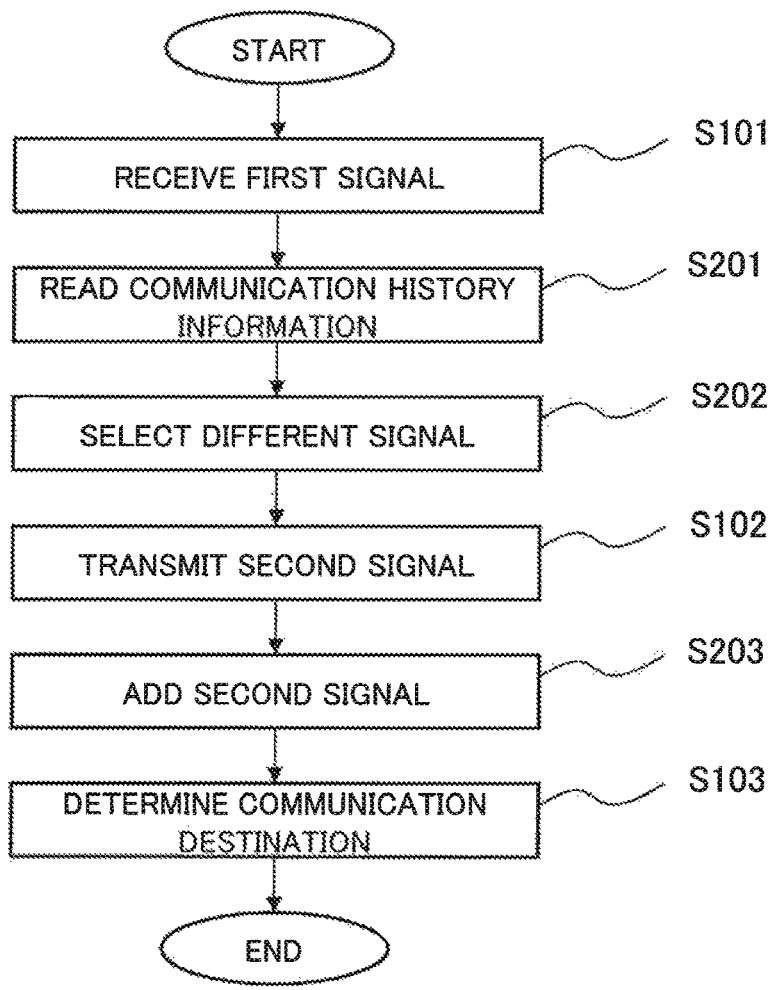
FIG. 6 is a flowchart illustrating the flow of processing in the communication destination determination device according to the second example embodiment.

Next, with reference to FIG. 6, the processing in the communication destination determination device 208 according to the second example embodiment will be described in detail. FIG. 6 is a flowchart illustrating the flow of the processing in the communication destination determination device 208 according to the second example embodiment.

The signal transmission unit 102 receives the first signal transmitted by the communication destination 104 (step S101).

The history specifying unit 205 reads the response signal included in the communication history information 210 (step S201). That is, in step S201, the history specifying unit 205 reads the response signal (the second signal), which has been transmitted to the communication destination 104, from the communication history information 210.

The signal selection unit 206 selects one response signal, which is different from the response signal read by the history specifying unit 205, from the response signals included in the signal information 209 (step S202). That is, in step S202, the signal selection unit 206 selects a response signal, which has not been transmitted to the communication destination 104, from response signals effective as a response for a request signal. When the communication history information 210 includes no response signals, it is sufficient if the signal selection unit 206 selects one response signal from the response signals included in the signal information 209. Alternatively, when the history specifying unit 205 includes no response signals, the signal selection unit 206 may select a predetermined response signal with respect to a received request signal from the response signals included in the signal information 209. For example, when it is known that many (or few) response signals transmitted in response to the request signal are biased to a specific response signal, the specific response signal may be set as the predetermined response signal.

The signal transmission unit 102 transmits the response signal (that is, the aforementioned second signal) selected by the signal selection unit 206 to the communication destination 104 (step S102).

The history update unit 207 updates the communication history information 210 by adding the response signal, which is transmitted by the signal transmission unit 102, to the communication history information 210 (step S203).

The processing may be performed in sequence of step S103 and step S203.

Next, effects for the communication destination determination device 208 according to the second example embodiment will be described.

According to the communication destination determination device 208, it is possible to detect the communication destination 104 that is suspicious as a threat. The reason for this is because the configuration of the communication destination determination device 208 include the configuration of the communication destination determination device 101 according to the first example embodiment.

In accordance with the communication destination determination device 208 according to the present example embodiment, it is possible to efficiently detect a suspicious communication destination 104 as a threat. The reason for this is because the communication destination determination device 208 can search for a specific response signal serving as a trigger by which the communication destination 104 transmits a request signal. When a response signal received in response to the request signal is the specific response signal, it is highly probable that a suspicious communication destination 104 as a threat will transmit the request signal by employing the response signal as a trigger. However, since the specific response signal is not clear, it is necessary to find out a specific response signal according to the communication destination 104 in order to more reliably detect a suspicious communication destination as a threat. When the request signal is received from the communication destination 104, the signal selection unit 206 selects a response signal different from the response signals included in the communication history information 210 from transmittable response signals included in the signal information 209. Since the signal transmission unit 102 transmits the response signal selected by the signal selection unit 206, it is highly probable to efficiently find out a specific response signal.

That is, in accordance with the communication destination determination device 208 according to the present example embodiment, it is possible to efficiently detect a suspicious communication destination as a threat.

In the aforementioned processing, the communication destination determination device 208 transmits the response signal different from the response signals included in the communication history information 210 to the communication destination 104; however, in the case of transmitting each response signal included in the signal information 209, it may be possible to employ a configuration for ending the process for transmitting the response signal.

Furthermore, the communication destination determination device 208 may be provided in a plural number. In this case, the plurality of communication destination determination devices 208 may employ a configuration for referring to one communication history information 210. For example, when the communication destination determination device 208 are provided in a plural number and each communication destination determination device 208 refers to one communication history information 210, it is possible to more efficiently detect a suspicious communication destination as a threat. The reason for this is because, when the communication destination 104 transmits a request signal to the plurality of communication destination determination devices 208 in a short period, each communication destination determination device 208 can share the communication history information 210 and transmit response signals, which are different from one another, to a communication destination.

Third Example Embodiment

Next, a third example embodiment of the present invention will be described.

In the following description, characteristics according to the present example embodiment will be mainly described, and the same reference numerals are given to elements similar to those of the aforementioned second example embodiment and a redundant description will be omitted.

Figure 9:
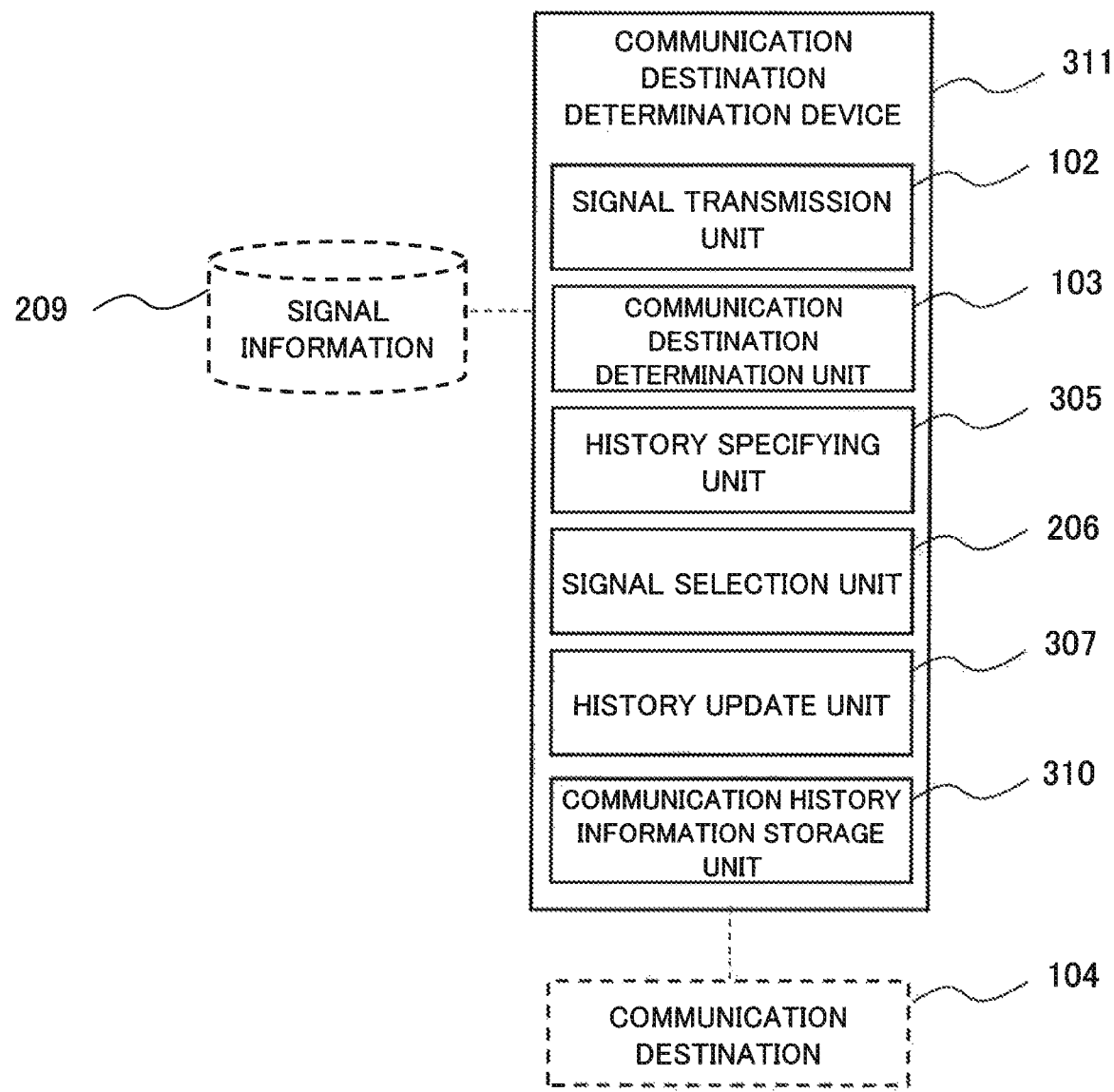
FIG. 9 is a block diagram illustrating a configuration of a communication destination determination device according to a third example embodiment of the present invention.

With reference to FIG. 9, configuration of a communication destination determination device 311 according to the third example embodiment of the present invention will be described in detail. FIG. 9 is a block diagram illustrating the configuration of the communication destination determination device 311 according to the third example embodiment of the present invention.

The communication destination determination device 311 according to the third example embodiment has the signal transmission unit (signal transmitter) 102, the communication destination determination unit (communication destination determiner) 103, a history specifying unit (history specifier) 305, the signal selection unit (signal selector) 206, a history update unit (history updater) 307, and a communication history information storage unit (communication history information storage) 310. The communication destination determination device 311 can refer to the signal information 209 as described with reference to FIG. 7.

The communication destination determination device 311 can perform communication connection with the communication destination (a communication device) 104 via the communication network.

Figure 10:
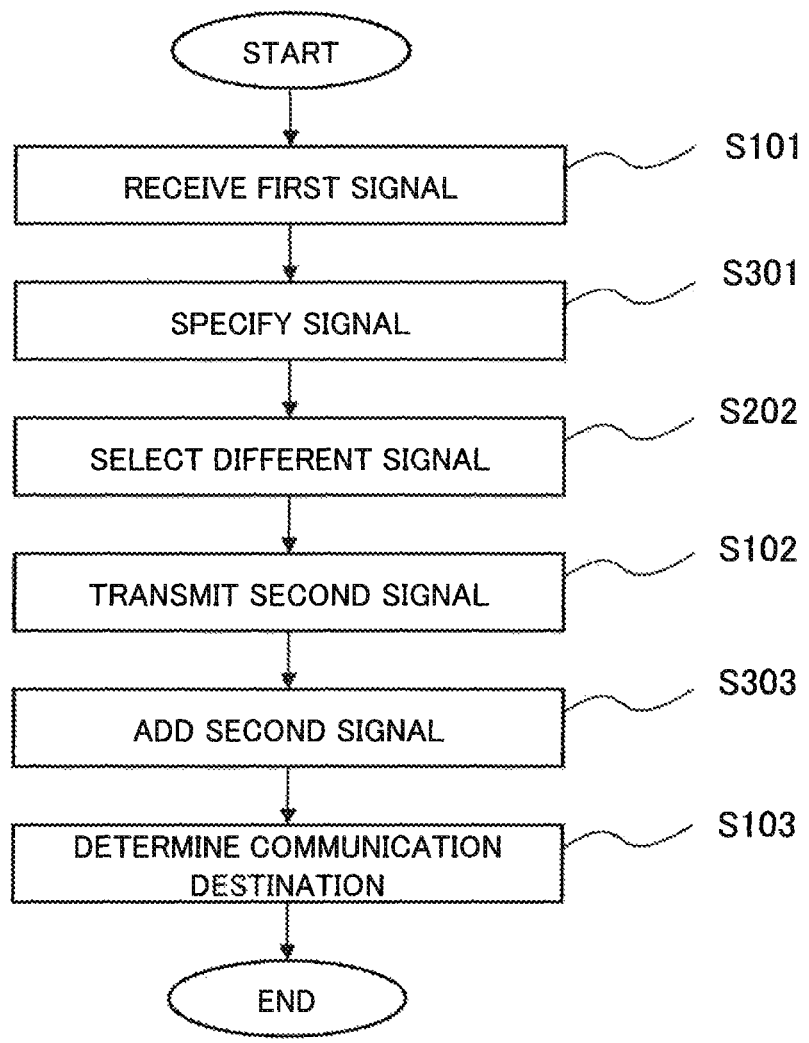
FIG. 10 is a flowchart illustrating the flow of processing in the communication destination determination device according to the third example embodiment.

Next, with reference to FIG. 10, processing in the communication destination determination device 311 according to the third example embodiment will be described in detail. FIG. 10 is a flowchart illustrating the flow of the processing in the communication destination determination device 311 according to the third example embodiment. The third example embodiment is different from the second example embodiment in terms of processing and the like for communication history information stored in the communication history information storage unit 310 for example, as compared with the second example embodiment.

The signal transmission unit 102 receives the first signal transmitted by the communication destination 104 (step S101).

The history specifying unit 305 reads a transmitted response signal on the basis of the communication history information, which is stored in the communication history information storage unit 310 and will be described with reference to FIG. 11 to FIG. 15 (step S301). The processing for step S301 will be described later with reference to FIG. 11 to FIG. 15.

The signal selection unit 206 selects one response signal, which is different from the response signal read by the history specifying unit 305, from the response signals included in the signal information 209 (step S202). That is, in step S202, the signal selection unit 206 selects a non-transmitted response signal from response signals effective as a response for a request signal. When the communication history information storage unit 310 includes no response signals for a received request signal, it is sufficient if the signal selection unit 206 selects one response signal from the response signals included in the signal information 209.

The signal transmission unit 102 transmits the response signal (that is, the aforementioned second signal) selected by the signal selection unit 206 to the communication destination 104 (step S102).

The history update unit 307 updates the communication history information in the communication history information storage unit 310 by adding the response signal, that is transmitted by the signal transmission unit 102, to the communication history information storage unit 310 (step S303). The process for step S303 will be described later with reference to FIG. 11 to FIG. 15.

The processing may be performed in sequence of step S103 and step S303. Furthermore, the processing of step S103 may be a determination process which will be described later with reference to FIG. 11 to FIG. 15.

Next, with reference to each diagram illustrated in FIG. 11 to FIG. 15, the processes of step S301 and step S303 in the communication destination determination device 311, the communication history information stored in the communication history information storage unit 310, and effects obtained by the processes will be described.

Figure 11:
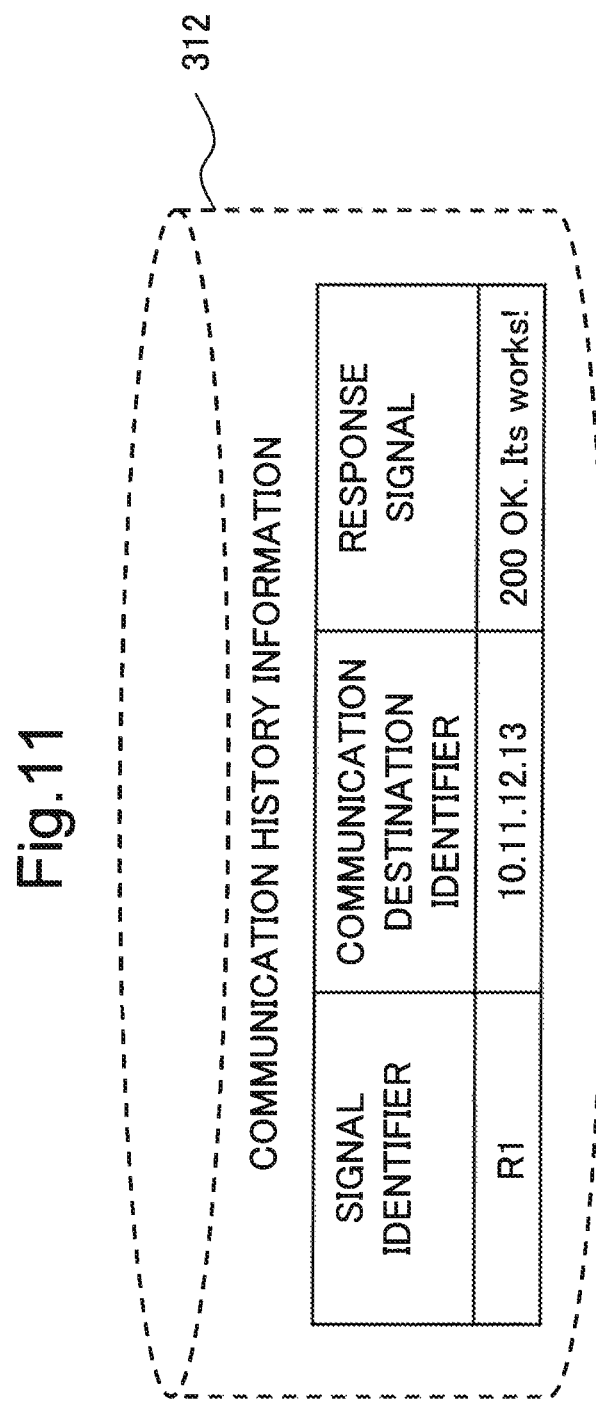
FIG. 11 is a diagram conceptually illustrating an example of communication history information.

Firstly, with reference to FIG. 11, communication history information 312 stored in the communication history information storage unit 310, the processing illustrated in step S301 (FIG. 10) and step S303 (FIG. 10), and effects obtained in the case of the communication history information 312 will be described. FIG. 11 is a diagram conceptually illustrating an example of the communication history information 312.

The communication history information 312 will be described.

The communication history information 312 is information in which a response signal transmitted to a certain communication destination, a communication destination identifier capable of identifying the certain communication destination, and a signal identifier capable of identifying the response signal are associated with one another. The communication history information 312 may not always include the signal identifier.

In the communication history information 312 exemplified in FIG. 11, a signal identifier "R1", a communication destination identifier "10. 11. 12. 13", and a response signal "200_OK._its_works!" are associated with one another. This represents a history that the signal identifier indicating the response signal "200_OK._Its_works!" is "R1" and the signal transmission unit 102 has transmitted the response signal "200_OK._Its_works!" to a communication destination indicated by the communication destination identifier "10. 11. 12. 13" in response to the request signal (the first signal).

The process of step S303 regarding the communication history information 312 will be described.

The history update unit 307, for example, specifies a communication destination identifier indicating a communication destination on the basis of the request signal (the first signal) exemplified in FIG. 3. The history update unit 307 generates information in which the specified communication destination identifier, the response signal, which has been transmitted to the communication destination from the signal transmission unit 102, and the signal identifier, which indicates the response signal, are associated with one another, and adds the generated information to the communication history information storage unit 310 as the communication history information 312.

The process of step S301 regarding the communication history information 312 will be described.

On the basis of the request signal (the first signal) exemplified in FIG. 3, the history specifying unit 305 specifies a communication destination identifier indicating a communication destination. The history specifying unit 305 specifies a response signal associated with the specified communication destination identifier in the communication history information 312 stored in the communication history information storage unit 310.

A description will be provided for effects obtained by the communication destination determination device 311 according to the present example embodiment when the communication history information is the communication history information 312. In accordance with the communication destination determination device 311 according to the present example embodiment, it is possible to more quickly detect a suspicious communication destination as a threat. The reason for this is because the communication destination determination device 311 can search for a specific response signal serving as a trigger, by which the communication destination 104 transmits a request signal, on the basis of the communication destination identifier. As described above, when a response signal received in response to a request signal is the specific response signal, it is highly probable that a suspicious communication destination 104 as a threat will transmit a request signal by employing the response signal as a trigger. However, since the specific response signal depends on the communication destination 104, it is necessary to find out the specific response signal depending on the communication destination 104 in order to quickly detect a suspicious communication destination as a threat. When a request signal is received from a certain communication destination, the signal selection unit 206 selects a response signal, which is different from a response signal transmitted to the certain communication destination, from transmittable response signals included in the signal information 209. Since the signal transmission unit 102 transmits the response signal selected by the signal selection unit 206, it is highly probable to find out the specific response signal.

Figure 12:
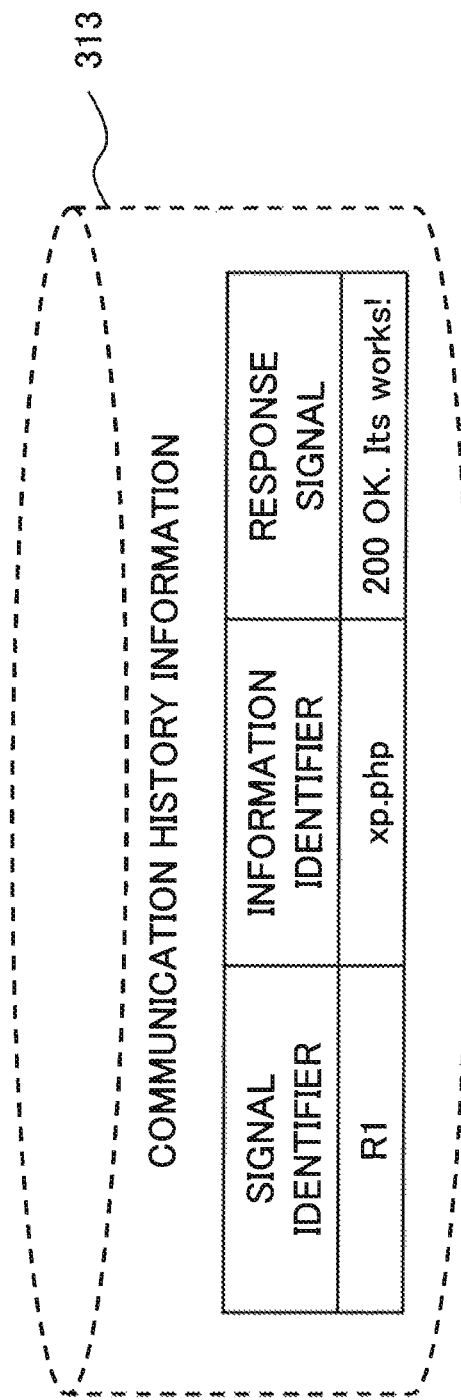
FIG. 12 is a diagram conceptually illustrating an example of communication history information.

Next, with reference to FIG. 12, communication history information 313 stored in the communication history information storage unit 310, the processing illustrated in step S301 (FIG. 10) and step S303 (FIG. 10), and effects obtained in the case of the communication history information 313 will be described. FIG. 12 is a diagram conceptually illustrating an example of the communication history information 313.

The communication history information 313 will be described.

The communication history information 313 is information in which a response signal transmitted to a certain communication destination, an information identifier capable of identifying information requested by a request signal transmitted by the certain communication destination, and a signal identifier capable of identifying the response signal are associated with one another. The communication history information 313 may not always include the signal identifier.

In the communication history information 313 exemplified in FIG. 12, a signal identifier "R1", an information identifier "xp.php", and a response signal "200_OK._its_works!" are associated with one another. This represents a history that the signal identifier indicating the response signal "200_OK._Its_works!" is "R1" and the signal transmission unit 102 has transmitted the response signal "200_OK._Its_works!" in response to the request signal (the first signal) requiring information indicated by the information identifier "xp.php".

The processing of step S303 regarding the communication history information 313 will be described.

On the basis of the request signal (the first signal) exemplified in FIG. 3, the history update unit 307 specifies an information identifier required by the request signal. The history update unit 307 generates information in which the specified information identifier, the response signal, which has been transmitted to the communication destination from the signal transmission unit 102, and the signal identifier, which indicates the response signal, are associated with one another, and adds the generated information to the communication history information storage unit 310 as the communication history information 313.

The processing of step S301 regarding the communication history information 312 will be described.

The history specifying unit 305 specifies an information identifier capable of identifying information requested by the request signal on the basis of the request signal (the first signal) exemplified in FIG. 3. The history specifying unit 305 specifies a response signal associated with the specified information identifier in the communication history information 312 stored in the communication history information storage unit 310.

The processing described with reference to FIG. 12 may be assumed to be a process mode in which the communication destination determination device 311 has the signal transmission unit 102 and the communication destination determination unit 103. In this case, when the first signal requiring certain information is received from a first communication destination via a communication network, the signal transmission unit 102 transmits the second signal in response to the first signal to the first communication destination. When the third signal requiring the certain information is received from a second communication destination within a certain time period after the timing of transmission of the second signal, the communication destination determination unit 103 determines that at least one of the first communication destination and the second communication destination is suspicious as a threat.

A description will be provided for effects obtained by the communication destination determination device 311 according to the present example embodiment when the communication history information is the communication history information 313. In accordance with the communication destination determination device 311 according to the present example embodiment, for example, even when a communication destination changes a communication destination identifier such as an IP address and then transmits a request signal, it is possible to efficiently detect a suspicious communication destination as a threat. The reason for this is because the communication destination determination device 311 searches for a specific response signal on the basis of information required by the request signal. The IP indicates an abbreviation for Internet_Protocol.

The reason for obtaining the aforementioned effects will be described in more detail. The communication destination 104 does not always transmit a request signal by using a communication destination identifier such as one IP address. In other words, it is probable that the communication destination 104 will transmit the request signal by using a plurality of IP addresses. In this case, the communication destination determination device 311 according to the present example embodiment does not select a response signal on the basis of the communication destination identifier, but selects a response signal on the basis of information required by the request signal. Consequently, in accordance with the communication destination determination device 311 according to the present example embodiment, for example, even when an IP address is changed, it is possible to efficiently search for a specific response signal on the basis of the requested information. That is, for example, even though there are a plurality of communication destinations, when the communication destinations perform a process for requiring specific information, it is possible to efficiently detect a suspicious communication destination as a threat in accordance with the communication destination determination device 311 according to the present example embodiment.

Figure 13:
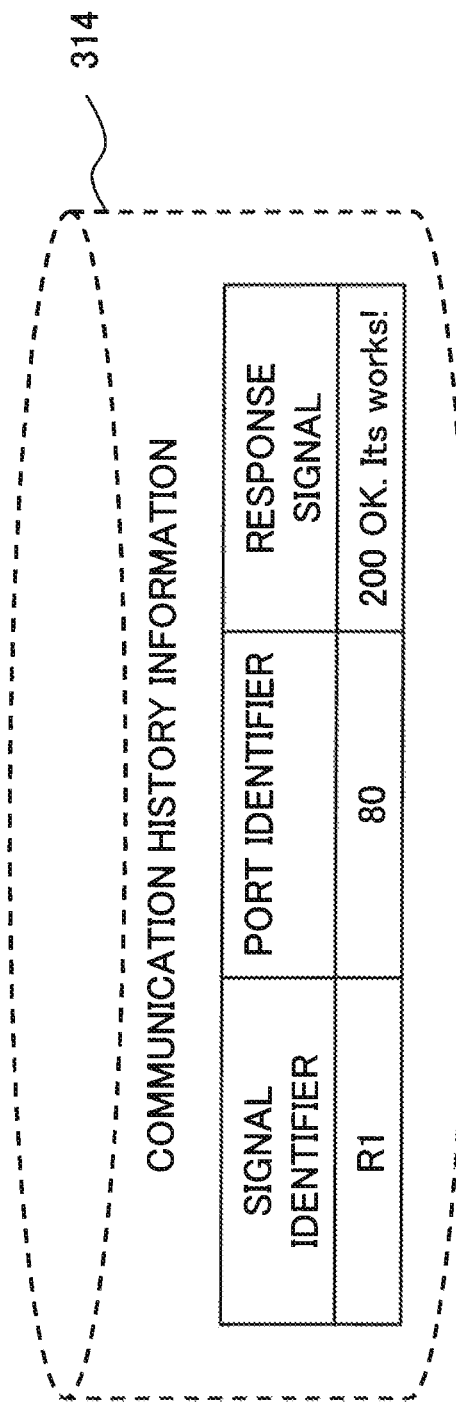
FIG. 13 is a diagram conceptually illustrating an example of communication history information.

Next, with reference to FIG. 13, communication history information 314 stored in the communication history information storage unit 310, the processing illustrated in step S301 (FIG. 10) and step S303 (FIG. 10), and effects obtained in the case of the communication history information 314 will be described. FIG. 13 is a diagram conceptually illustrating an example of the communication history information 314.

The communication history information 314 will be described.

The communication history information 314 is information in which a response signal transmitted to a certain communication destination, a port identifier (for example, a port number) via which a request signal transmitted by the certain communication destination is received, and a signal identifier capable of identifying the response signal are associated with one another. The communication history information 314 may not always include the signal identifier.

In the communication history information 314 exemplified in FIG. 13, a signal identifier "R1", a port identifier "80", and a response signal "200_OK._its_works!" are associated with one another. This represents a history that the signal identifier indicating the response signal "200_OK._Its_works!" is "R1" and the signal transmission unit 102 has transmitted the response signal "200_OK._Its_works!" to the communication destination 104 in response to the request signal (the first signal) received via the port identifier "80".

The processing of step S303 regarding the communication history information 314 will be described.

The history update unit 307 specifies a port identifier via which the request signal (the first signal) exemplified in FIG. 3 is received. The history update unit 307 generates information in which the specified port identifier, the response signal, which has been transmitted to the communication destination from the signal transmission unit 102, and the signal identifier, which indicates the response signal, are associated with one another, and adds the generated information to the communication history information storage unit 310 as the communication history information 314.

The processing of step S301 regarding the communication history information 314 will be described.

The history specifying unit 305 specifies a port identifier via which the request signal (the first signal) is received. The history specifying unit 305 specifies a response signal associated with the specified port identifier in the communication history information 314 stored in the communication history information storage unit 310.

The processing described with reference to FIG. 13 may be assumed to be a process mode in which the communication destination determination device 311 has the signal transmission unit 102 and the communication destination determination unit 103. In this case, when the first signal is received from a first communication destination via a port through which communication connection with the communication network is performed, the signal transmission unit 102 transmits the second signal in response to the first signal to the first communication destination. When the third signal is received from a second communication destination via the port within a certain time period after the timing of transmission of the second signal, the communication destination determination unit 103 determines that at least one of the first communication destination and the second communication destination is suspicious as a threat.

A description will be provided for effects obtained by the communication destination determination device 311 according to the present example embodiment when the communication history information is the communication history information 314. In accordance with the communication destination determination device 311 according to the present example embodiment, it is possible to efficiently detect a suspicious communication destination as a threat. The reason for this is as follows. For example, even though the communication destination 104 requires various types of information by using a plurality of IP addresses, when port identifiers of the communication destination, which transmits the request signal, are equal to each other, it is possible to select a non-transmitted response signal on the basis of the port identifiers. That is, for example, even though there are a plurality of communication destinations, when the communication destinations perform a process for transmitting a request to a port indicated by a specific port identifier, it is possible to efficiently detect a suspicious communication destination as a threat on the basis of the port identifier in accordance with the communication destination determination device 311 according to the present example embodiment.

Figure 14:
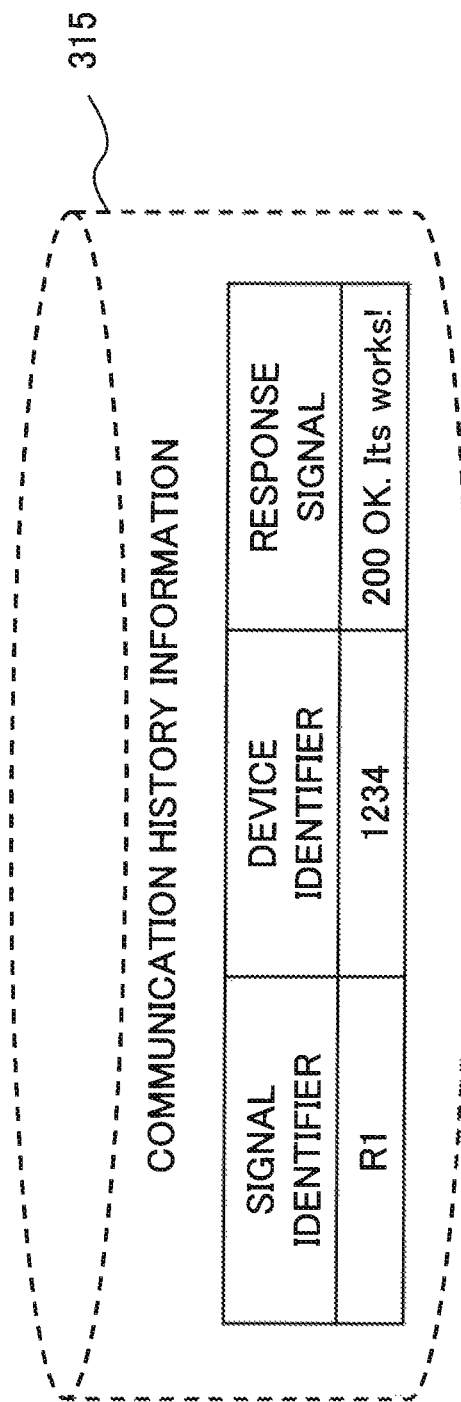
FIG. 14 is a diagram conceptually illustrating an example of communication history information.

Next, with reference to FIG. 14, communication history information 315 stored in the communication history information storage unit 310, the processing illustrated in step S301 (FIG. 10) and step S303 (FIG. 10), and effects obtained in the case of the communication history information 315 will be described. FIG. 14 is a diagram conceptually illustrating an example of the communication history information 315.

The communication history information 315 will be described.

The communication history information 315 is information in which a response signal transmitted to a certain communication destination, a device identifier (for example, an AS number) capable of identifying a device via which the certain communication destination transmits a request signal, and a signal identifier capable of identifying the response signal are associated with one another. The AS indicates an abbreviation for Autonomous_System. The communication history information 315 may not always include the signal identifier.

In the communication history information 315 exemplified in FIG. 14, a signal identifier "R1", a device identifier "1234", and a response signal "200_OK._its_works!" are associated with one another. This represents a history that the signal identifier indicating the response signal "200_OK._Its_works!" is "R1" and the signal transmission unit 102 has transmitted the response signal "200_OK._Its_works!" to a communication destination in response to the request signal (the first signal) received via the device identifier "1234".

The processing of step S303 regarding the communication history information 315 will be described.

The history update unit 307 specifies a device identifier (an AS number) via which a communication destination indicated by a communication destination identifier transmits a request signal on the basis of the communication destination identifier included in the request signal (the first signal) exemplified in FIG. 3. The method for specifying the AS number (the device identifier) based on the communication destination identifier will not be described. The history update unit 307 generates information in which the specified device identifier, the response signal, which has been transmitted to the communication destination from the signal transmission unit 102, and the signal identifier, which indicates the response signal, are associated with one another, and adds the generated information to the communication history information storage unit 310 as the communication history information 315.

The processing of step S301 regarding the communication history information 315 will be described.

The history specifying unit 305 specifies the AS number via which the communication destination indicated by the communication destination identifier transmits a request signal on the basis of the communication destination identifier included in the request signal (the first signal). The history specifying unit 305 specifies a response signal associated with the specified device identifier in the communication history information 315 stored in the communication history information storage unit 310.

The processing described with reference to FIG. 14 may be assumed to be a process mode in which the communication destination determination device 311 has the signal transmission unit 102 and the communication destination determination unit 103. In this case, when the first signal is received from a first communication destination via the communication network, the signal transmission unit 102 transmits the second signal in response to the first signal to the first communication destination. When the third signal is received from a second communication destination within a certain time period after the timing of transmission of the second signal, the communication destination determination unit 103 specifies a first device via which communication with the first communication destination is performed and a second device via which communication with the second communication destination is performed. When the specified first device and the specified second device coincide with each other, the communication destination determination unit 103 determines that at least one of the first communication destination and the second communication destination is suspicious as a threat.

A description will be provided for effects obtained by the communication destination determination device 311 according to the present example embodiment when the communication history information is the communication history information 315. In accordance with the communication destination determination device 311 according to the present example embodiment, it is possible to efficiently detect a suspicious communication destination as a threat. The reason for this is as follows. For example, when a communication destination transmits a request signal via a specific device, it is possible to select a non-transmitted response signal on the basis of a device identifier indicating the specific device. That is, for example, even though there are a plurality of communication destinations, when the communication destinations perform a process for transmitting a request via a device indicated by a specific device identifier, it is possible to efficiently detect a suspicious communication destination as a threat on the basis of the device identifier in accordance with the communication destination determination device 311 according to the present example embodiment.

Next, with reference to FIG. 15, communication history information 316 stored in the communication history information storage unit 310, the processing illustrated in step S301 (FIG. 10) and step S303 (FIG. 10), and effects obtained in the case of the communication history information 316 will be described. FIG. 14 is a diagram conceptually illustrating an example of the communication history information 316.

The communication history information 316 will be described.

The communication history information 316 is information in which a response signal transmitted to a certain communication destination, a time zone in which a request signal is received from the certain communication destination, and a signal identifier capable of identifying the response signal are associated with one another. The communication history information 316 may not always include the signal identifier.

Figure 15:
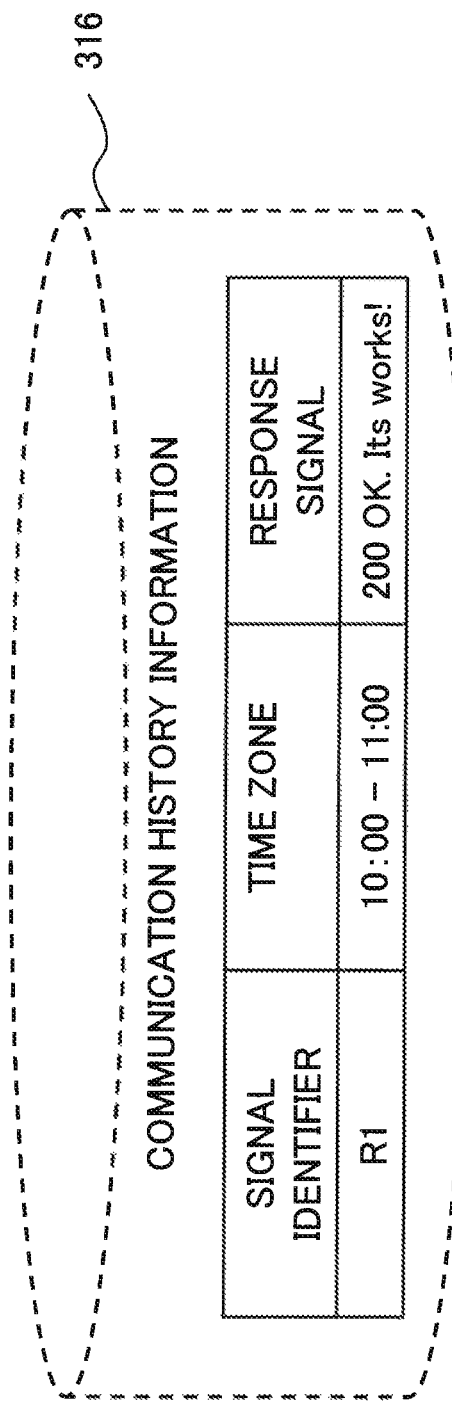
FIG. 15 is a diagram conceptually illustrating an example of communication history information.

In the communication history information 316 exemplified in FIG. 15, a signal identifier "R1", a time zone "10:00 to 11:00", and a response signal "200_OK._its_works!" are associated with one another. This represents a history that the signal identifier indicating the response signal "200_OK._Its_works!" is "R1" and the signal transmission unit 102 has transmitted the response signal "200_OK._Its_works!" to the communication destination 104 in response to the request signal (the first signal) received in the time zone "10:00 to 11:00".

The processing of step S303 regarding the communication history information 316 will be described.

The history update unit 307 calculates a time zone including a time at which the request signal (the first signal) exemplified in FIG. 3 is received. The time zone, for example, is a time zone in which one day (that is, 24 hours) is divided every hour. The time zone needs not to be decided in advance, and for example, may be calculated on the basis of a time at which a request is received. The history update unit 307 generates information in which the calculated time zone, the response signal, which has been transmitted to the communication destination from the signal transmission unit 102, and the signal identifier, which indicates the response signal, are associated with one another, and adds the generated information to the communication history information storage unit 310 as the communication history information 316.

The processing of step S301 regarding the communication history information 316 will be described.

The history specifying unit 305 calculates a time zone including a time at which the request signal (the first signal) is received. The history specifying unit 305 specifies a response signal associated with the calculated time zone in the communication history information 312 stored in the communication history information storage unit 310.

A description will be provided for effects obtained by the communication destination determination device 311 according to the present example embodiment in the case of the communication history information 316. In accordance with the communication destination determination device 311 according to the present example embodiment, it is possible to efficiently detect a suspicious communication destination 104 as a threat. The reason for this is as follows. For example, when the communication destination transmits a request signal in a specific time zone, it is possible to select a non-transmitted response signal on the basis of the time zone. That is, for example, even though there are a plurality of communication destinations, when the communication destinations perform a process for transmitting a request signal in the specific time zone, it is possible to efficiently detect a suspicious communication destination as a threat on the basis of the time zone in accordance with the communication destination determination device 311 according to the present example embodiment.

The communication history information may be information obtained by combining at least two of the communication history information illustrated in FIG. 11 to FIG. 15 with one another.

According to the communication destination determination device 311, it is further possible to detect a further suspicious communication destination 104 as a threat, in addition to the aforementioned effects. The reason for this is because the configuration of the communication destination determination device 311 include the configuration of the communication destination determination device 311 according to the first example embodiment.

(Hardware Configuration Example)

A configuration example of hardware resources that realize the communication destination determination device according to each example embodiment of the present invention will be described. However, the communication destination determination device may be realized using physically or functionally at least two calculation processing devices. Further, the communication destination determination device may be realized as a dedicated apparatus.

Figure 16:
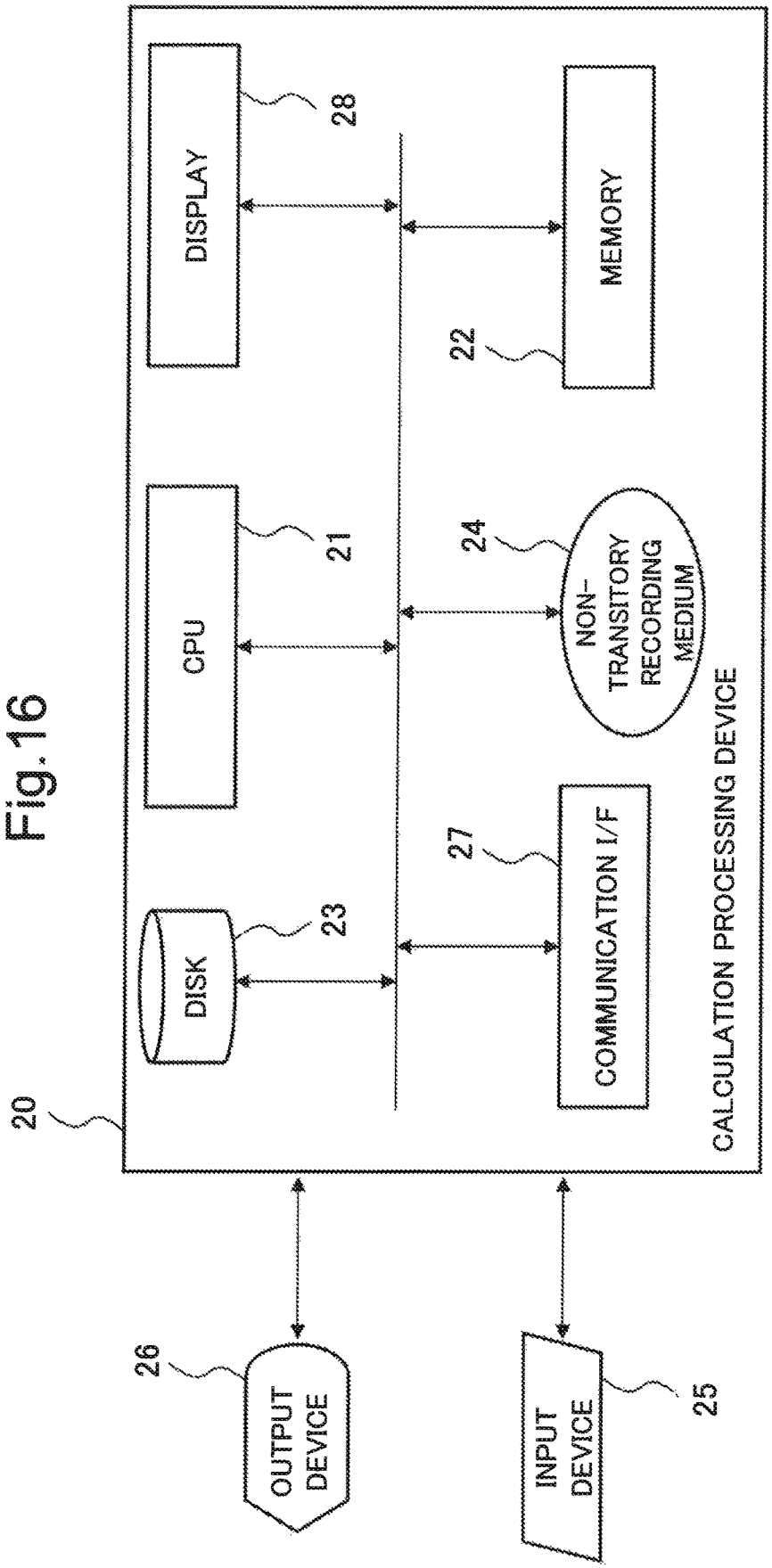
FIG. 16 is a block diagram schematically illustrating a hardware configuration of a calculation processing device capable of realizing the communication destination determination device according to each example embodiment of the present invention.

FIG. 16 is a block diagram schematically illustrating a hardware configuration of a calculation processing device capable of realizing the communication destination determination device according to the first to third example embodiments of the present invention. A calculation processing device 20 includes a central processing unit (CPU) 21, a memory 22, a disk 23, a non-transitory recording medium 24, a communication interface (hereinafter, expressed as. "communication I/F") 27 and a display 28. The calculation processing device 20 may connect an input device 25 and an output device 26. The calculation processing device 20 can execute transmission/reception of information to/from another calculation processing device and a communication apparatus via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored by the disk 23 when executing the program and executes arithmetic processing. The CPU 21 reads data necessary for program execution from the memory 22. When display is needed, the CPU 21 displays an output result on the display 28. When a program is input from the outside, the CPU 21 reads the program from the input device 25. The CPU 21 interprets and executes an communication destination determination program (FIG. 2, FIG. 6, or FIG. 10) present on the memory 22 corresponding to a function (processing) indicated by each unit illustrated in FIG. 1, FIG. 5, or FIG. 9 described above. The CPU 21 sequentially executes the processing described in each example embodiment of the present invention.

In other words, in such a case, it is conceivable that the present invention can also be made using the communication destination determination program. Further, it is conceivable that the present invention can also be made using a computer-readable, non-transitory recording medium storing the communication destination determination program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2015-178305, filed on Sep. 10, 2015, the disclosure of which is incorporated herein in its entirety.

REFERENCE SIGNS LIST 101 communication destination determination device
102 signal transmission unit
103 communication destination determination unit
104 communication destination
205 history specifying unit
206 signal selection unit
207 history update unit
208 communication destination determination device
209 signal information
210 communication history information
305 history specifying unit
307 history update unit
310 communication history information storage unit
311 communication destination determination device
312 communication history information
313 communication history information
314 communication history information
315 communication history information
316 communication history information
20 calculation processing device
21 CPU
22 memory
23 disk
24 non-transitory recording medium
25 input device
26 output device
27 communication IF
28 display

What is claimed is:

1. A communication destination determination device comprising:
   a signal transmitter configured to transmit a second signal in response to a first signal to a communication destination when the first signal is received from the communication destination via a communication network;
   a communication destination determiner configured to determine whether or not the communication destination is suspicious as a threat on a basis of whether or not a third signal transmitted from the communication destination is received within a certain time period after a timing of transmission of the second signal;
   a signal selector configured to search a signal serving a trigger by the communication destination based on the determination result and select a signal different from each of signals that have been transmitted to the communication destination;
   a history specifier configured to read a signal from communication history information including the second signal transmitted to the communication destination when the first signal is received from the communication destination; and
   a history updater configured to add the second signal transmitted by the signal transmitter to the communication history information, wherein
   the signal selector selects a signal different from the signal read by the history specifier from signal information including a signal transmittable to the communication destination, and the signal transmitter transmits the signal selected by the signal selector to the communication destination as the second signal.

2. The communication destination determination device according to claim 1, further comprising:
a history information storage capable of storing the communication history information including communication information in which a communication destination identifier, which is able to identify the communication destination, and the second signal, which has been transmitted to the communication destination, are associated with each other, wherein,
when a fourth signal is received from a certain communication destination, the history specifier specifies a signal associated with a communication destination identifier indicating the certain communication destination in the communication history information,
the signal selector selects a signal different from the signal specified by the history specifier from the signal information, and
the history updater generates communication information in which a communication destination identifier, which has been transmitted by the signal transmitter and indicates the communication destination, and the second signal, which has been transmitted by the signal transmitter, are associated with each other, and adds the generated communication information to the communication history information.

3. The communication destination determination device according to claim 1, further comprising:
a history information storage capable of storing the communication history information including communication information in which a time zone, in which the first signal has been received, and the second signal, which has been transmitted with respect to the first signal, are associated with each other, wherein,
when a fourth signal is received in a certain time zone, the history specifier specifies a signal associated with the certain time zone in the communication history information,
the signal selector selects a signal different from the signal specified by the history specifier from the signal information, and
the history updater generates communication information in which the certain time zone, and the second signal, which has been transmitted by the signal transmitter, are associated with each other, and adds the generated communication information to the communication history information.

4. The communication destination determination device according to claim 1, further comprising:
a history information storage capable of storing the communication history information including communication information in which a time zone, in which the first signal has been received from the communication destination, a communication destination identifier, which is able to identify the communication destination, and the second signal, which has been transmitted in response to the first signal, are associated with each other, wherein,
when a fourth signal is received from a communication destination indicated by a certain communication destination identifier in a certain time zone, the history specifier specifies a signal associated with the certain communication destination identifier and the certain time zone in the communication history information, the signal selector selects a signal different from the signal specified by the history specifier from the signal information, and
the history updater generates communication information in which the certain communication destination identifier, the certain time zone, and the second signal, which has been transmitted by the signal transmitter, are associated with each other, and adds the generated communication information to the communication history information.

5. The communication destination determination device according to claim 1, wherein
the signal transmitter does not transmit the second signal when the signal selector determines that the signal different from the signal specified by the history specifier is not included in the signal information.

6. A communication destination determination method comprising:
transmitting a second signal in response to a first signal to a communication destination when the first signal is received from the communication destination via a communication network;
determining whether or not the communication destination is suspicious as a threat on a basis of whether or not a third signal transmitted from the communication destination is received within a certain time period after a timing of transmission of the second signal;
searching a signal serving a trigger by the communication destination based on the determination result;
selecting a signal different from each of signals that have been transmitted to the communication destination;
reading a signal from communication history information including the second signal transmitted to the communication destination when the first signal is received from the communication destination; and
adding the second signal to the communication history information;
selecting a signal different than the signal that has been read from the communication history information, from signal information including a signal transmittable to the communication destination;
transmitting the selected signal by the signal selector to the communication destination as the second signal.

7. A non-transitory recoding medium storing a communication destination determination program recorded therein, the program making a computer achieve:
a signal transmission function configured to transmit a second signal in response to a first signal to a communication destination when the first signal is received from the communication destination via a communication network;
a communication destination determination function configured to determine whether or not the communication destination is suspicious as a threat on a basis of whether or not a third signal transmitted from the communication destination is received within a certain time period after a timing of transmission of the second signal;
a signal selector function configured to search a signal serving a trigger by the communication destination based on the determination result and select a signal different from each of signals that have been transmitted to the communication destination;
a history specifier function configured to read a signal from communication history information including the second signal transmitted to the communication destination when the first signal is received from the communication destination; and a history updater function configured to add the second signal transmitted by the signal transmission function to the communication history information, wherein the signal selector function selects a signal different from the signal read by the history specifier from signal information including a signal transmittable to the communication destination, and the signal transmission function transmits the signal selected by the signal selector function to the communication destination as the second signal.

* * * * *